July 31, 1956   M. L. MARTIN ET AL   2,756,507
MEASURING DEVICE FOR BOLT OR ROLL GOODS
Filed May 3, 1955   2 Sheets-Sheet 1
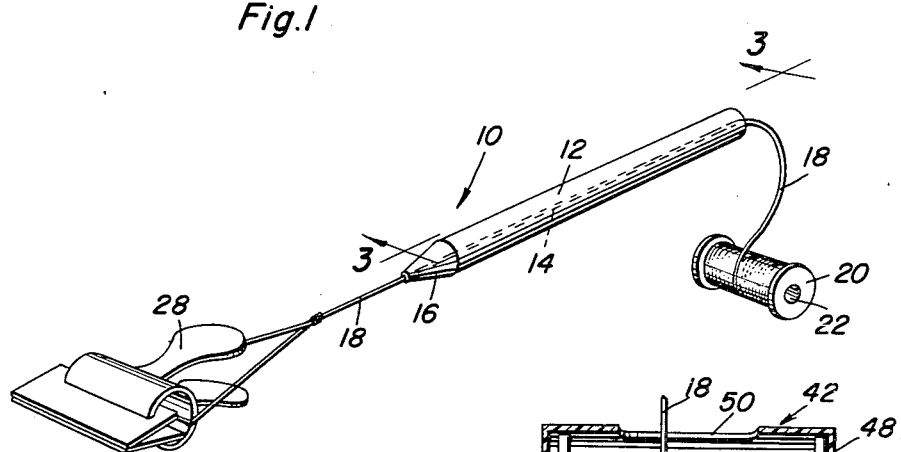
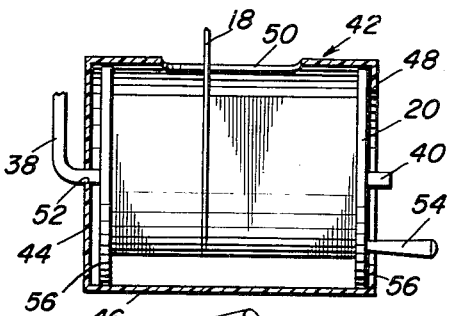
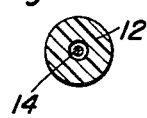
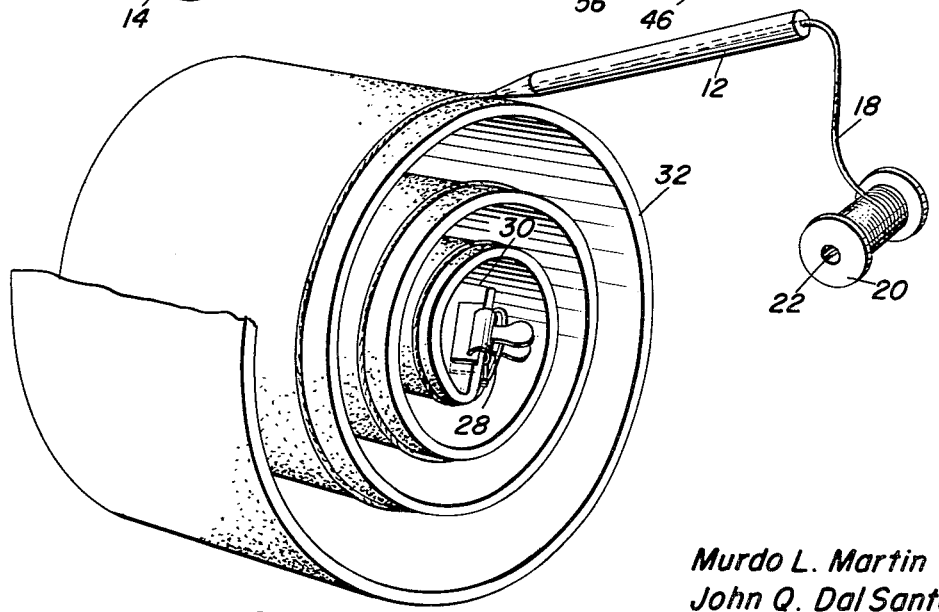
Murdo L. Martin
John Q. DalSanto
INVENTORS

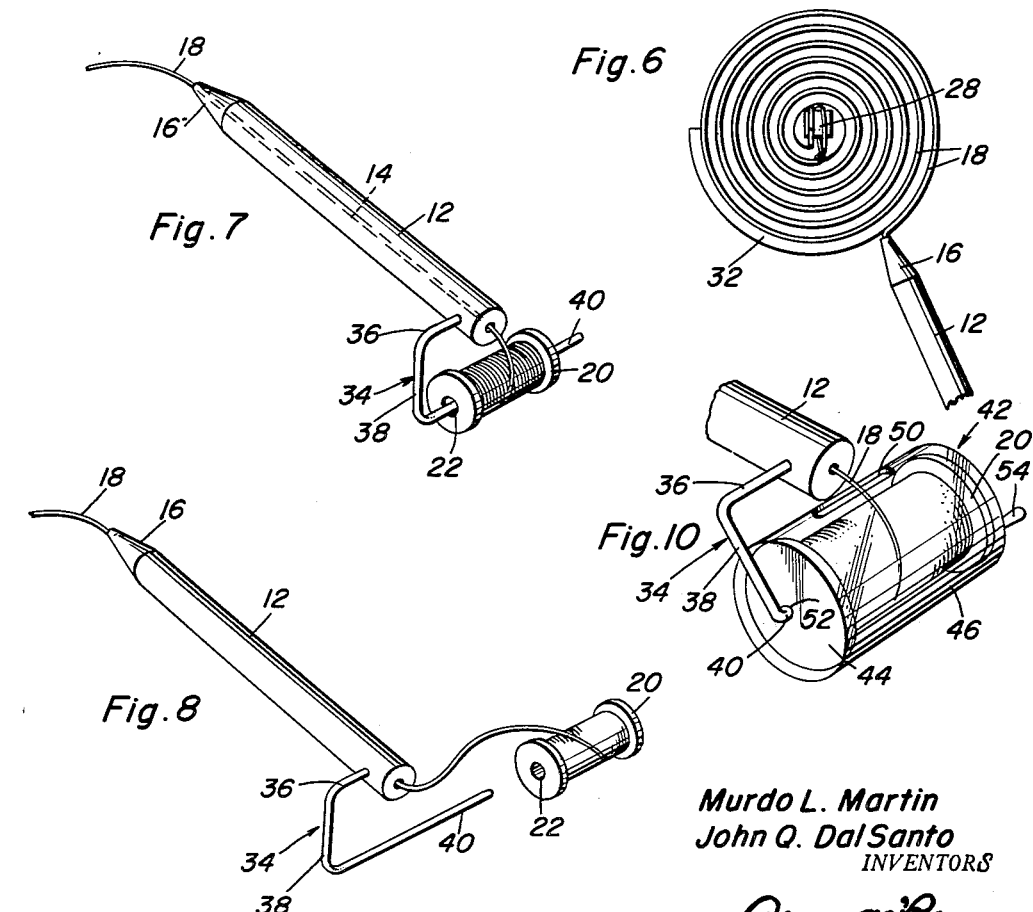

United States Patent Office 2,756,507
Patented July 31, 1956

2,756,507

MEASURING DEVICE FOR BOLT OR ROLL GOODS

Murdo L. Martin and John Q. Dal Santo,
Albuquerque, N. Mex.

Application May 3, 1955, Serial No. 505,612

1 Claim. (Cl. 33—139)

This invention relates generally to measuring devices for packaged fabrics such as bolt or roll goods, i. e., rolls of carpeting, and is more specifically concerned with a relatively economically manufactured readily useable measuring device wherein the work done previously by two or three men requiring an excessive amount of time can be accomplished rapidly and expeditiously by a single person.

Accordingly a principal object in conformance with that set forth above is to provide a readily usable roll material measuring device utilizing a readily measurable and manipulable means utilized with a bolt of rolled material wherein said measuring means is utilized with the material rolled up and does not necessitate the unrolling thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the novel measuring device;

Figure 2 is a perspective view of the novel measuring device as applied to a bolt or roll of material being measured;

Figure 3 is a longitudinal sectional view taken substantially on line 3—3 of Figure 1;

Figure 4 is a transverse sectional view taken substantially on line 4—4 of Figure 3;

Figure 5 is a side elevational view of the measuring cord utilized in the novel measuring device illustrating the marking indicia thereon;

Figure 6 is a side elevational view showing the measuring cord being applied to a bolt of rolled material;

Figure 7 is a perspective view of the novel measuring device showing a mounting bracket for the roll of measuring cord;

Figure 8 is a perspective view similar to Figure 7 and showing the spool of measuring cord removed from the mounting bracket;

Figure 9 is an enlarged sectional view taken substantially on line 9—9 of Figure 10, showing a housing for the spool of measuring cord; and Figure 10 is a perspective view of a housing element for the spool of cord which is supported on a spool support bracket.

Indicated generally at 10 is the novel measuring device which comprises a handle member 12 of wood, plastic or any other suitable material, said handle member including a longitudinal bore 14 extending therethrough, and a pointed end portion 16, said pointed end being insertable between the various layers of a bolt of rolled material.

Extending through the handle element 12 is a measuring cord 18 which is freely movable therethrough, said cord being generally coiled about a suitable spool 20 which has a longitudinal bore 22. The measuring cord 18 may include thereon suitable measuring indicia which may be of different colors such as black and white as indicated at 24 and 26, respectively, in Figure 5 or any other suitable indicating indicia, said cord being graduated, for example, feet, inches, etc.

Connected at the end of the measuring cord 18 opposite the spool 20 is a suitable clamp element 28 of any conventional nature, the primary purpose thereof being to secure the cord to the innermost end portion 30 of a bolt of material 32 as seen in Figure 2, for example.

It is readily apparent that the clamp member 28 after being secured to the end 30 of the bolt of material 32, the point 16 of the handle element 12 may be inserted between the various layers by moving the handle element around the various layers wherein finally the outside of the bolt of rolled material is reached the measuring device may be removed and the measuring device will indicate the approximate length of the bolt of rolled material without having to unroll the same.

This operation is readily perceptible as seen in Figure 6.

As seen in Figures 7 and 8, the handle element 12 may include thereon the spool support bracket 34 which includes the transverse arm 36 terminating in a downwardly extending bight portion 38 which terminates in a portion 40 which is parallel to the arm 36. The arm 36 may be secured to the handle element 12 in any suitable manner. As viewed in Figures 7 and 8 it is readily perceptible that the spool 20 by means of the longitudinal passage 22 is journaled on the leg 40 and the previously described operation can be accomplished.

As seen in Figures 9 and 10, the bracket 34 may support on portion 40 thereof a spool housing element 42 which may be of a suitable clear and flexible plastic, the housing including an end portion 44, a tubular or cylindrical central portion 46 and an annular flange portion 48, see Figure 9. The portion 46 includes a longitudinally extending slot 50 through which the cord 18 will extend, and the end 44 includes a central aperture 52 through which portion 40 of the bracket extends. The spool 20 will include an outwardly extending pin or handle 54 which may be rotated in order to wind the cord 18 thereupon. As previously mentioned, the housing member 42 consists of a suitable plastic wherein the annular flange 48 may be spread apart and the spool 20 be inserted within the housing. The ends of the spool 56 will be supported within the housing and the spool will be rotated therein in a manner which is believed to be readily apparent.

It is believed readily apparent in view of the description above, that there has been presented a novel bolt or roll measuring device which readily conforms to the objects of invention heretofore set forth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

A device for measuring convolutely rolled material comprising a cord adapted for connection at one end to the inner end of the material, a tubular handle having the cord slidable therethrough and manipulative to extend the cord between the convolutions of the material, a transverse terminal bracket on one end of the handle comprising relatively short and long parallel spaced arms and a bight portion connecting the arms, the short arm extending radially from said handle to space the long arm below and transversely of the handle, a cylindrical housing, and an axially bored spool in the housing on which the cord is wound, said housing having a closed end through which the long arm extends into the bore of the spool and fixedly supports the housing while rotatably supporting the spool, said housing having an internal spool retaining flange in its other end flexible for insertion of the spool therethrough into the housing.

References Cited in the file of this patent

UNITED STATES PATENTS

| | | |
|---|---|---|
| 156,586 | McNeill | Nov. 3, 1874 |
| 375,026 | Tuxbury | Dec. 20, 1887 |
| 667,586 | Scott | Feb. 5, 1901 |

FOREIGN PATENTS

| | | |
|---|---|---|
| 333,377 | Great Britain | Aug. 14, 1930 |